(No Model.)
R. D'HEUREUSE.
SAFETY FLUID TRAP.
No. 303,822. Patented Aug. 19, 1884.
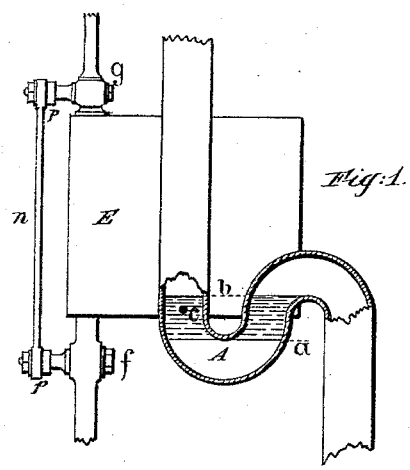
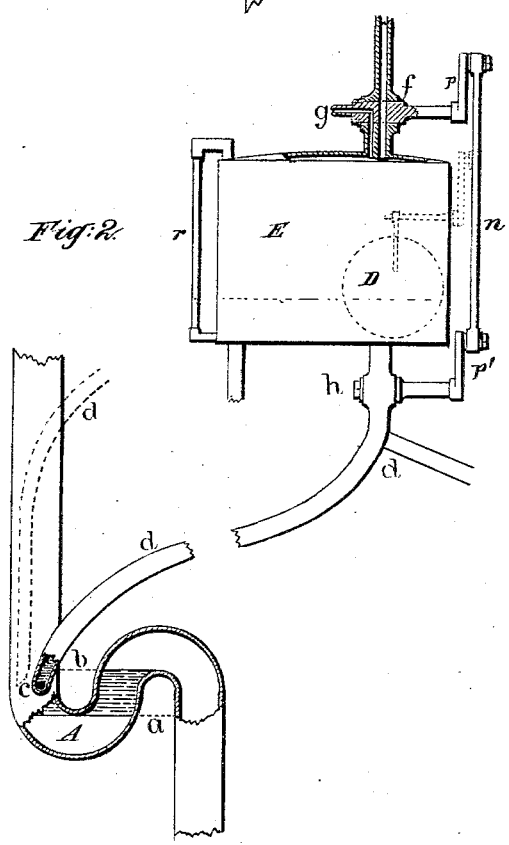
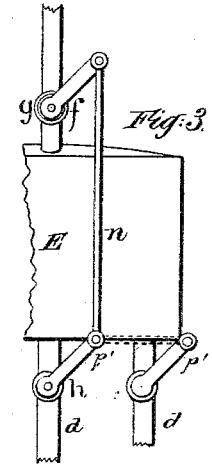
Witnesses:
J. E. Renwee.
Charles R. Searle.
Inventor:
R. d'Heureuse

UNITED STATES PATENT OFFICE.

RUDOLPH D'HEUREUSE, OF NEW YORK, N. Y.

SAFETY FLUID-TRAP.

SPECIFICATION forming part of Letters Patent No. 303,822, dated August 19, 1884.

Application filed October 8, 1883. (No model.)

*To all whom it may concern:*

Be it known that I, RUDOLPH D'HEUREUSE, a citizen of the United States, residing at New York city, in the county and State of New York, have invented certain new and useful Improvements in Safety Fluid-Traps, of which the following is a specification.

This invention relates to traps used in dwellings, public and private buildings of all kinds, to prevent the entrance of "sewer-gas" (so called) through the waste-pipes of wash-basins, sinks, bath-tubs, water-closets, &c., into the building.

It is the object of my invention to prevent any communication between the sewer-pipes and the interior of the building from taking place by reason of the siphoning or drying out of the water in the trap, and to apply disinfectants or deodorizers to the trap in a convenient, constant, economical, and effective manner.

My invention consists of an attachment to the trap, comprising, among other features, an air-tight vessel by which water disinfectants or deodorizers in solution are carried in small quantities into the trap, and the water in the same is at once renewed whenever it gets low enough to open or threaten air-communication with the sewer-pipe, acting upon the well-known principle that a perfectly air-tight vessel full of water, with an opening below which dips in water and is closed by it, cannot discharge the water unless air is admitted by the orifice rising above the water that closed it. The flow from the vessel will then be exactly equivalent to the volume of air admitted, and will stop again immediately when the opening ceases to admit air.

In the drawings annexed, Figures 1 and 2 represent partly sectional elevations of the device, and Fig. 3 an elevation of part of Fig. 2, showing a different view.

The same letters indicate corresponding parts in all the figures.

A is a trap, (here representing a siphon-trap) in which *b* is the overflow-water line; *a*, the water-line at or below which air-communication would become established (below the top of the lower bend of the trap.)

C is a hole in the trap, between the water-levels *b* and *a* or the open end of a pipe entering the trap higher up, communicating directly (see Fig. 1) or by pipe *d* (see Fig. 2) with a close vessel, E, to be always kept filled with water, disinfectant, or deodorizer in solution above the hole or orifice C. I have shown the connection C at that side of the trap at which the water enters. This is important, because it presents the hole so that the flow of the water through the main pipe tends to assist the operation. The cock *f* serves to fill the vessel E when the water gets low, and may be preferably constructed so that on opening it the air in E is allowed to escape—for instance, by air-vent *g* in cock *f*, Fig. 2—though a separate air-vent may be applied, (*g*, Fig. 1.)

To avoid possible omissions, it is preferable to fill with water and discharge the air by the same movement, and the connection of the lever arrangement of the cock-stems of *f* and *g* by rod *n*. Fig. 1 represents a mode by which it can be effected.

The crank *p* to cock-stem *f g*, Figs. 2 and 3, and *p'* to cock-stem *h*, both cranks connected by rod *n*, represent an arrangement by which *f* and *g* may open while simultaneously *h* closes and opens when *f* and *g* close. The air is discharged from E, which fills with water without allowing, in the meantime, the water to run into the trap through pipe *d*.

In Fig. 2, *d d* indicate several pipes leading from vessel E, which may supply more than one trap at about the same level, the pipes *d d* to be rigid or flexible. A float, D, Fig. 2, in dotted lines, with its connections to the rod that operates the filling, air discharging, and distributing cocks or valves, is shown, to indicate that these operations may be performed automatically when the water in E falls low. It is plain that the vessel E can be filled by other modes than by cock *f*, for instance, a cap may be unscrewed and a funnel used, or some other contrivance employed without connected movements.

In Fig. 2, *r* is a water-gage, to be employed when the vessel E is of metal or other opaque material. If the vessel E be of glass or partly glass, the lowering of the water-level in E would be readily observed without such gage.

To describe the operation of the device, suppose the vessel E is filled with water, disinfectant, or deodorizing solution, so much of it will run out at C into the traps on closing the cock $f$ and air-vent $g$ and opening the cock $h$ to pipe $d$, Figs. 2 and 3, as to expand whatever air may be left in E exactly conformably to the difference between the levels of water in E and water-level $b$ of the trap, when no more water can flow from E, this vessel being perfectly closed except toward the trap. As soon, however, as the water in the trap, by evaporation or other cause, sinks below the upper edge of the orifice C, some air will immediately enter and ascend through the water into E, from which a corresponding amount of water, disinfectant, or deodorizer will flow into the trap until the hole or orifice C is covered with water, when, by reason of no air being admitted, no more water can flow from E. As long, therefore, as water remains in E or pipe $d$ above the hole C or orifice C of pipe $d$, there is safety against entrance of sewer-gas through the trap.

The operation of the device where pipe $d$ serves for connection with E is precisely the same as by immediate contact of E to the trap. In place of communicating by the hole C, the pipe $d$ may enter the trap at any place above the water-level $b$, (see $d$ in dotted lines, Fig. 2,) extending downward and opening below the water-line $b$, and above line $a$ by an orifice, C, the operation being the same as above described, and the device applicable to traps of whatever description. A small hole is all that is required for C—say one-half to one-fourth inch diameter—to admit all the air or water intended to pass through it, while the pipe or connection with E may widen immediately. The hole or orifice C of pipe $d$ at any place in the trap between the high level $b$ and low level $a$ will accomplish the purpose, so that the water in the trap may not fall and remain below $a$. Provision can be easily made by any suitable device—for instance, by a pin to be worked from the outside, or connected with cocks or equivalents $f$ or $h$—to move simultaneously to prevent choking up of the hole C by lodgement of impurities.

Frequent disinfecting or deodorizing of traps and connections is of vital importance. The mode by which it is ordinarily done—that is to say, to pour into the basin or closet at intervals a solution of the disinfectant—is wasteful, inconvenient, and unreliable. This is greatly improved by feeding the disinfectant or deodorizer in solution by a trap supply-vessel, in the manner described, discharging automatically into the trap by hole or orifice C of pipe $d$, above the lower water-level, $a$, and below $b$, so as to keep the water-seal constantly intact, even for weeks or months of disuse of the trap.

Modifications may be made in the details. For example, in place of the cocks $f$, $g$, or $h$, valves may be used, and other arrangements for connecting their simultaneous operation applied.

Parts of the invention may be used without the whole.

The invention may be used with no mechanical connection between the cocks $f$ $g$ $h$, care being taken that the operator shall understand and always work the cocks simultaneously.

I claim as my invention—

1. A trap for waste-pipes, wash-basins, and analogous uses, combined with a close or air-tight vessel for water or liquid disinfectant or deodorizer, and provided with a discharge-outlet which communicates with the interior of the trap between the overflow or discharge level and the sealing or safety level thereof, whereby the water in the trap is prevented from falling below the danger-line, substantially as described.

2. In combination with a trap, the vessel E, constructed as described, and having a discharge-outlet which communicates with the interior of the trap between the overflow and danger levels, and provided with a water-supply pipe and devices whereby water may be admitted thereto and air discharged therefrom simultaneously, substantially as and for the purposes set forth.

3. In combination with a trap and the close vessel E, having a communication with the interior of the trap between the overflow and danger levels, the water-supply and air-vent valves or cocks and cut-off $h$, and devices whereby when the water-supply and air-vent valves are opened the cut-off $h$ is closed, and vice versa, substantially as and for the purposes set forth.

4. In combination with a trap, a close vessel having a communication with the interior of the trap between the overflow and danger levels, the said communication opening into the trap in the direction of the flow, substantially as and for the purposes set forth.

5. In combination with a trap, the close vessel E, provided with the discharge-pipe $d$, which communicates with the interior of the trap between the overflow and the danger levels, substantially as set forth.

6. In combination with a trap, the close vessel E, provided with water-supply and air-vent cocks or valves and a discharge-pipe, $d$, which communicates with the interior of the trap between the overflow and danger levels, substantially as set forth.

7. In combination with a trap, the close vessel E, provided with water-supply and air-vent cocks or valves, and a discharge-pipe, $d$, having a cut-off, $h$, which discharge-pipe communicates with the interior of the trap between the overflow and danger levels, substantially as set forth.

In testimony whereof I have hereunto set my hand this 5th day of October, 1883.

R. D'HEUREUSE.

Witnesses:
L. HERLEIN,
C. SPIETH.